United States Patent [19]

Husted

[11] Patent Number: 4,521,207
[45] Date of Patent: Jun. 4, 1985

[54] INCREMENTALLY VARIABLE TRANSMISSION

[75] Inventor: Royce H. Husted, 711 Lakeside, Wheaton, Ill. 60187

[73] Assignees: Royce H. Husted, Wheaton; Samuel Shiber, Mundelein, both of Ill.

[21] Appl. No.: 456,736

[22] Filed: Jan. 10, 1983

Related U.S. Application Data

[63] Continuation-in-part of Ser. No. 387,618, Jun. 11, 1982, Pat. No. 4,493,678, which is a continuation-in-part of Ser. No. 310,506, Oct. 13, 1981, abandoned.

[51] Int. Cl.³ .......................... F16H 9/10; F16H 9/24; F16H 9/02; F16H 55/30
[52] U.S. Cl. ...................................... 474/56; 474/49; 474/164
[58] Field of Search ...................... 474/49, 56, 57, 164

[56] References Cited

U.S. PATENT DOCUMENTS

| 370,087 | 9/1887 | Riley | 474/56 |
|---|---|---|---|
| 524,830 | 8/1894 | Leggo | 474/56 |
| 593,895 | 11/1897 | Jasper | 474/54 |
| 708,232 | 9/1902 | Jackling | 474/56 |
| 742,497 | 10/1903 | Rowand | 474/56 |
| 809,169 | 1/1906 | Brennan | 474/56 |
| 2,421,368 | 6/1947 | Aubert | 474/56 |
| 3,477,770 | 11/1969 | Niemi | 308/3.6 |
| 3,661,024 | 9/1972 | Cooke | 474/56 |
| 3,850,044 | 11/1974 | Hagen | 474/56 |
| 3,850,045 | 11/1974 | Hagen | 474/56 |
| 3,867,851 | 2/1975 | Gregory | 474/56 |
| 3,938,403 | 2/1976 | Donaldson | 474/56 |
| 3,956,943 | 5/1976 | Yamasaki | 474/164 |
| 3,985,403 | 10/1976 | Gallinato-Contino | 308/3.6 |
| 3,995,508 | 12/1976 | Newell | 474/56 |
| 4,129,044 | 12/1978 | Erickson | 474/55 |
| 4,260,386 | 4/1981 | Frohardt | 474/72 |
| 4,268,259 | 5/1981 | Segawa et al. | 474/164 |
| 4,304,449 | 12/1981 | Litchfield et al. | 308/3.6 |
| 4,325,702 | 4/1982 | Jacobsson | 474/56 |
| 4,330,286 | 5/1982 | Nagano | 474/164 |
| 4,342,559 | 8/1982 | Williams | 474/56 |
| 4,412,703 | 11/1983 | Simonson | 308/3.6 |

FOREIGN PATENT DOCUMENTS

| 0008851 | 3/1980 | European Pat. Off. . |
| 3107255 | 9/1982 | Fed. Rep. of Germany . |
| 961243 | 5/1950 | France . |
| 453712 | 9/1936 | United Kingdom . |
| 2062142 | 5/1981 | United Kingdom . |

OTHER PUBLICATIONS

"Automatic Bike Transmission", Popular Science, Nov. 1980, David Scott, pp. 82-83.
Hagen, All-Speed Advertisment.
Fact Sheet: New Tokheim Gear Maker 5 Speed Bicycle Transmission, Fact Sheet.

Primary Examiner—Lawrence J. Staar
Assistant Examiner—Michael David Bednarek
Attorney, Agent, or Firm—Samuel Shiber

[57] ABSTRACT

An incrementally variable transmission, particularly suitable for a bicycle, having a variable sprocket which comprises: A drive flange and an indexing flange mounted on an axle with a pair of sprocket-segment-planets and at least a pair of idler-planets sandwiched between said flanges and forming a relatively rigid structure, the planets adapted to expand and contract in response to a relative rotation of the flanges and thereby increase and decrease, respectively, the effective diameter of the variable-sprocket.

6 Claims, 12 Drawing Figures

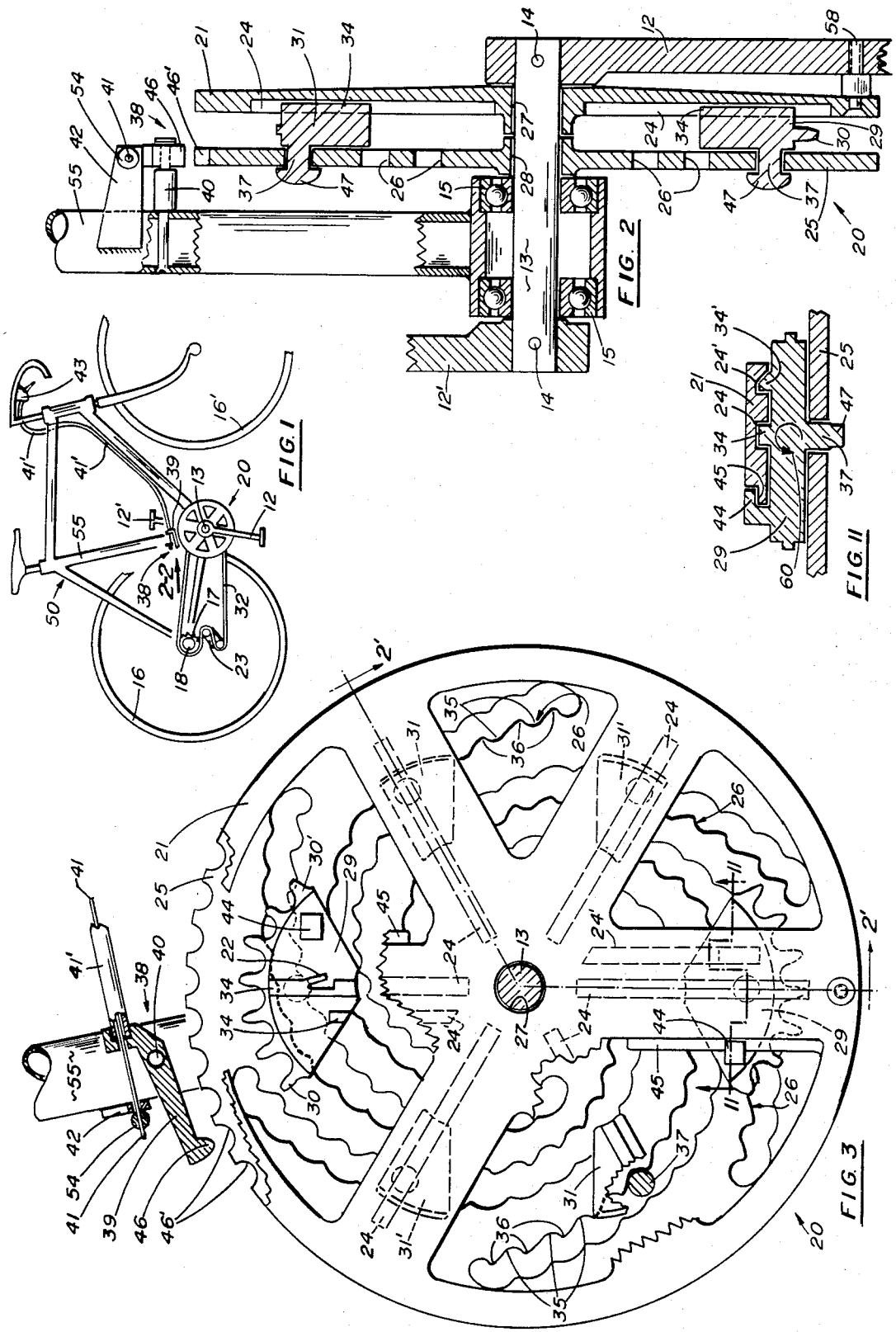

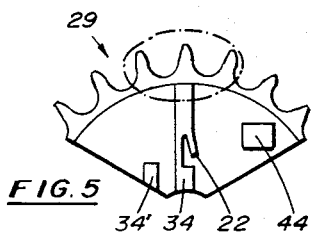
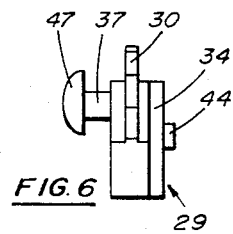
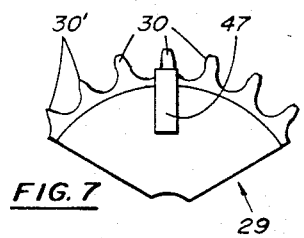
FIG. 5  FIG. 6  FIG. 7
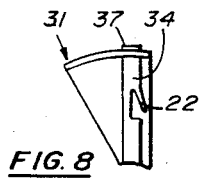
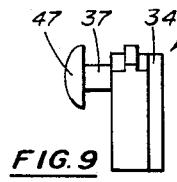
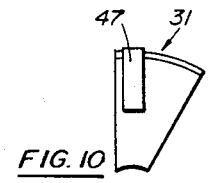
FIG. 8  FIG. 9  FIG. 10
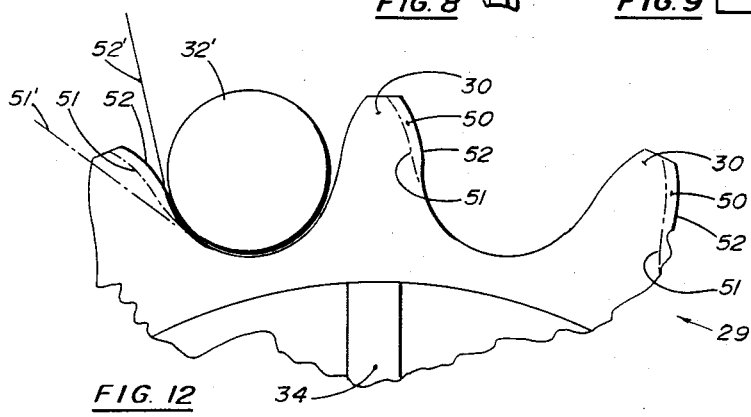
FIG. 12
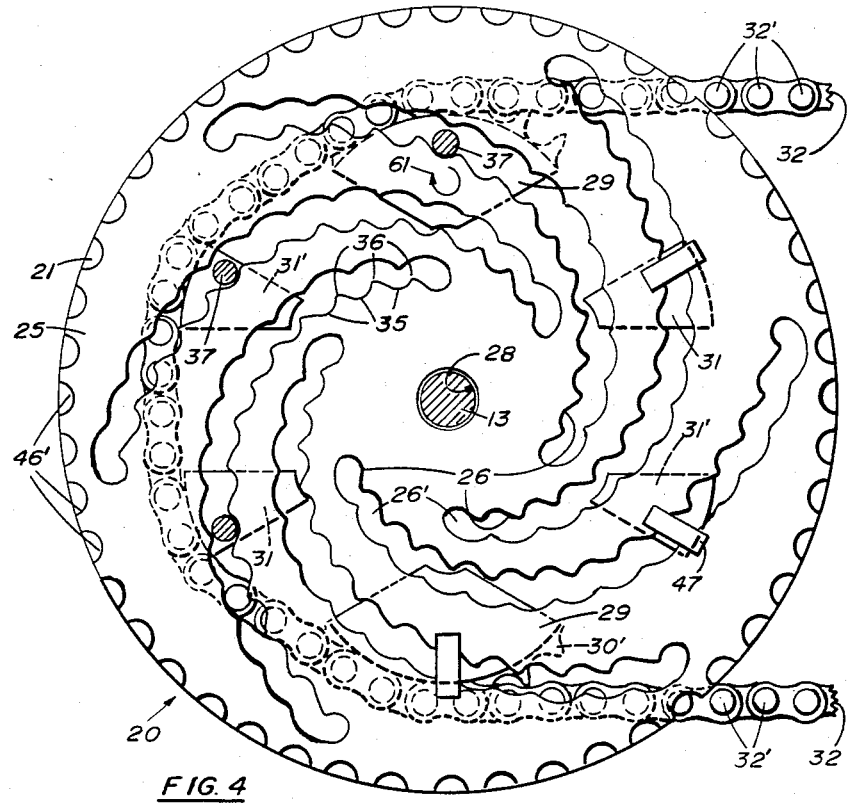
FIG. 4

INCREMENTALLY VARIABLE TRANSMISSION

CROSS REFERENCE TO RELATED APPLICATIONS

This application is a continuation in part of my copending application Ser. No. 06/387618 which was filed on June 11, 1982 now U.S. Pat. No. 4,493,678 and which is a continuation in part of my copending application Ser. No. 06/310506, now abandoned, which was filed on Oct. 13, 1981.

BACKGROUND AND OBJECTIVES OF THE INVENTION

Presently, ten speed bicycle transmissions consist of a chain wrapped around a front double sprocket and a rear cluster containing five sprockets, a front derailleur and a rear derailleur for derailing the chain from one sprocket to another in response to a rider moving two control levers which are connected to the derailleurs. The derailleurs are made of a large number of delicate parts which need frequent maintenance and are easily damaged. The derailleur system is also hard to operate, it generates a continuous noise and inefficiencies in certain gears due to chain's misalignment and it calls for a frequent visual inspection by the rider, to visually verify the gear ratio he is in, diverting his attention from the road. For these reasons several attempts have been made in the past to introduce different systems, some of which are based on variable sprockets. Examples of such efforts can be found in U.S. Pat. Nos. 3,850,044 and 3,850,045. Some of the reasons for such systems being commercially unsuccessful, on a large scale, were their complexity, high cost, added weight and maintenance problems. Another example is found in British Pat. No. 453712 where the two flanges are stacked together with the planets being side saddled in a cantilevered position. Such an arrangement induces severe stresses under working loads which leads to severe deformation of the variable sprocket under working loads, especially since the flanges have to be perforated and loose most of their structural integrity. These deformations interfere with the synchronization of the sprocket-segment-planets and the chain. In contrast, the object of the present invention is to overcome these and other problems, and provide a simple durable system which can be economically mass produced from metal or molded plastic.

SUMMARY OF THE INVENTION

An incrementally variable transmission, for providing a plurality of distinct gear ratios and particularly suitable for bicycles. The transmission is based on a variable sprocket comprising a drive flange and an indexing flange mounted on an axle with a pair of sprocket-segment-planets and at least two idler-planets sandwiched between and slidably connected to the flanges forming a relatively rigid structure. The planets are adapted to expand and contract in response to a relative rotation of the flanges and thereby increase or decrease the effective diameter of the variable sprocket (the effective diameter, as used herein, shall mean the length of chain passing over the sprocket per revolution, divided by 3.14). Further, the present invention utilizes a modified tooth shape for positively engaging the chain and additional related refinements in the relative location of the planets.

BRIEF DESCRIPTION OF THE DRAWINGS

FIG. 1 shows a side view of a bicycle equipped with an incrementally variable transmission according to the present invention, FIG. 2 shows a portion of the bicycle and the variable sprocket as viewed in the direction pointed by an arrow 2—2 marked on FIG. 1, with the sprocket itself sectioned along line 2'—2' marked on FIG. 3, FIG. 3 shows a partially broken front view of the variable sprocket, FIG. 4 shows a rear view of the variable sprocket with three of the six locking means removed, FIGS. 5, 6 and 7 show front, side and rear views, respectively, of a sprocket-segment-planet, FIGS. 8, 9 and 10 show front, side and rear views, respectively, of an idler-planet, FIG. 11 shows a cross section of an area of the variable sprocket which contains the sprocket-segment-planet, as viewed along section line 11—11 marked on FIG. 3, and, FIG. 12 shows an enlarged area of the sprocket-segment-planet which is marked on FIG. 5 by an eliptical phantom line.

DESCRIPTION OF THE SPECIFIC EMBODIMENT

The attached FIGURES show a bicycle (please note FIG. 1) having a frame 50, with a seat post member 55, pedals 12 & 12' which are affixed to an axle 13 by pins 14 (FIG. 2). The axle 13 is rotatably mounted in the frame by means of ball-bearings 15. Rear and front wheels 16 & 16' are also rotatably mounted to the frame 50 in a conventional manner. The bicycle is equipped with an incrementally variable transmission comprising a variable-sprocket 20 which is coupled by a conventional roller chain 32 to a sprocket 17 that is, in turn, conventionally coupled to the rear wheel 16 via a one-way clutch 18.

The sprocket 20 (FIGS. 2, 3, 4 & 11) is mounted on the axle 13, and has:

a drive flange 21 having a bore 27 which is fitted on the axle 13 and is affixed to the pedal 12 by a bolt 58, an indexing flange 25 having a round bore 28 which is rotatably fitted on the axle 13 opposite of the drive flange 21 and has a plurality of spiral-wavy-cams 26, two sprocket-segment-planets 29 (identical elements, or identical parts thereof, will be identified by the same numbers) and four idler-planets 31 & 31' (planet 31' is a mirror image of planet 31) sandwiched between the flanges 21 & 25, coupling means, in the form of keys 34 & 34' and respective radial keyways 24 & 24', for tangentially connecting said planets to said drive flange 21, cam-followers 37 attached to each of the planets 29, 31 & 31', for engaging with and following their respective spiral-wavy-cam 26, the spiral-wavy-cam comprising a series of alternating depressions 35 and hills 36 (FIGS. 3 & 4). Whenever the cam-follower 37 moves from one depression 35 to the next, it moves over the hill 36 at which point it is further away from the axle 13 (and the center of the sprocket 20) than when it is seated in either of the depressions 35 between which it is moving. As the planet slides along the spiral-wavy-cam 26, from one depression to the next, the effective diameter of the sprocket 20 decreases and increases, respectively, in response to a relative rotation between the flanges 21 & 25. Locking means 47 formed at the end of the cam-followers 37 slides along and engages an outer surface of the indexing flange 25. Under working loads which may cause a slight deformation of the indexing flange 25, the locking means 47 engages with the outer surface of the indexing flange 25 and prevents the separation of the planets from it (the shape of the locking means 47 allows their insertion through slots 26' for attaching them to the indexing flange 25). The sprocket-segment-planets 29 are equipped with additional locking means, in the form of a hook 44 which slides along and engages with an outer surface 45 of the drive flange 21, to resist together with the key 34 the tendency of the sprocket-segment-planet 29 to rotate (in a direction shown by circular arrow 61, FIG. 4) and twist (in a direction of circular arrow 60, FIG. 11), due to the tangential force that the chain's load creates on teeth 30.

The planets 29, 31 & 31' each have a small cantilever spring 22 (FIGS. 3, 5 & 8) which is formed as a part of the key 34, to create a preload between the key 34 and the keyway 24 to prevent the planets from developing an annoying rattle while they are not engaged with the chain 32.

The chain 32 (FIG. 4) is wrapped around approximately one half of the sprocket 20, and engages with the teeth 30 that are located on a rounded section of the sprocket-segment-planets 29. Part of the leading teeth 30' is removed to prevent interference with the chain 32 when the transmission is in high gear ratios. The chain 32 is made of links and has a pitch length equalling the length of the chain 32 divided by the number of links contained in the chain. It should be understood that while a conventional bicycle roller chain is preferred, the term chain covers other chains and toothed belts which could also be used for putting together the system.

As the bicycle is pedaled, load is developed in the chain 32 which in turn creates tangential and radial loads on the planets. The tangential loads are taken by the sprocket-segment-planets 29 and are transmitted to the keys 34 & 34' which are formed on the side of each of the sprocket-segment-planets 29, and which engage with and slide in the radial keyway 24 & 24', respectively, transmitting these loads to the drive flange 21. Radial loads which develop in the planets around which the chain 32 is wrapped, are transmitted to the spiral-wavy-cams 26, through cam-followers 37 formed on the sides of the planets 29, 31 & 31'. The radial load secures and properly positions the planets in the depressions 35.

Since only a small fraction of the periphery of the sprocket 20 carries chain engaging teeth 30, it is preferred to design the shape of some of these teeth 30 so that they positively engage with rollers 32' of the chain, to prevent the chain from disengaging by escaping over the teeth, especially under dynamic loads which are associated with bicycling. To achieve the positive engagement of the chain's roller 32' the design of a standard tooth shape of a commercial roller-chain sprocket (which was established by the American Standards Association and approved by the industry) is modified (FIG. 12) by adding a section 50 which is defined between the phantom line 51 and line 52. The line 51 marks the commercial tooth shape and line 52 is the modified tooth shape. A phantom line 51' and a line 52' mark imaginary inclined planes on which the roller 32' has to climb, in order to disengage from the tooth 30, in the case of the commercial and the modified tooth shapes, respectively. The inclined plane 52' is so steep that it prevents the load in the chain from pulling the roller 32' over the tooth 30, whereas experience has shown that in the case of an unmodified commercial tooth shape the roller 32' may occasionally climb over the tooth.

However, since in the case of the present invention the chain's load secures the engagement between the chain 32 and the teeth 30, it is preferred to remove the load from the sprocket-segment-planet 29 which is about to disengage from the chain 32, and since the engagement of the one sprocket-segment-planet 29 (which takes place at the top of the sprocket 20) occurs slightly before the disengagement of the other sprocket-segment-planet 29 (which takes place at the bottom of the sprocket 20), it is possible, by radially displacing the depressions 35 a fraction of a millimeter towards the axle 13 (relative to their theoretical position which corresponds to zero slack in the chain section which warps half of the sprockt 20 and which is engaged with both sprocket-segment-planets 29 and is trapped between them. This chain section will be referred to as trapped chain) to maintain the trapped chain substantially without slack but at the same time to assure that the trapped chain is not taut which in turn assures that the chain's load has been transferred to the newly engaged sprocket-segment-planet 29 from the previously engaged sprocket-segment-planet 29 freeing it to disengage from the chain 32. The small radial displacement of the depressions 35 which is required to assure the smooth disengagement does not interfere with the operation of the sprocket 20 and the length of the trapped chain remains subtantially an integral (natural) number of pitches whenever the sprocket 20 is operational, in any of the gear ratios, and therefor, the synchronization (that is, the proper meshing) between the chain 32 and the teeth 30 is maintained. Excessive or insufficient slack would prevent proper synchronization of the chain 32 with the sprocket-segment-planet 29 at the point of their engagement, causing the teeth 30 to hit the roller 32'. Further, insufficient slack would not only prevent the engaging sprocket-segment-planet 29 from assuming the chain's load but instead it would generate an additional load in the trapped chain and between the chain 32 and both of the sprocket-segment-planets 29, and may make the chain's disengagement from the sprocket 20 difficult. The actual characteristics of the disengagement may vary with the prevailing coefficient of friction between the roller 32' and the tooth 30, however, since it is neccessary to assure engagement with low coefficient of friction, when a high coefficient of friction prevails the disengagement becomes erratic unless the diesengaging sprocket-segment-planet 29 is relieved of the chain's load.

A brake assembly 38 (FIGS. 2 & 3) has an arm 39 which is pivoted on a stud 40 which is affixed to the frame member 55. The arm 39 has a rounded pawl 46 which is adapted to engage and brake dimples 46' which are formed in the periphery of the indexing flange 25 in response to being pushed by an outer jacket 41' of a cable 41 which is secured to a bracket 42 by means of a crimped ferrule 54. At their other end the cable 41 and its jacket 41' are connected to a conventional hand lever assembly 43 which the rider can depress in order to move the cable 41 relative to the jacket 41', and thereby engage the brake 38. When the indexing flange 25 is braked and the drive flange 21 is rotated through the pedals 12 & 12', forward and backwards, intersections of the keyways 24 and the spiral-wavy-cams 26 expand and contract together with the plants, respectively, causing the transmission to change to a high gear ratio and a low ratio, respectively.

The spiral-wavy-cams 26 are arranged so that the sprocket-segment-planets 29 remain at a substantially symmetrical position relative to the axle 13, so that an imaginary line drawn through the sprocket-segment-planets 29 will pass through the axle 13. Thereby, at least one sprocket-segment-planet 29 is engaged with the chain 32 at all times to maintain the power transmission between the sprockets 17 & 20, but most of the time only one sprocket-segment-planet 29 is engaged with the chain 32, allowing the transmission to change to a higher gear ratio (if the sprocket-segment-planets 29 were clustered together, at a certain point during the rotation of the sprocket 20 none would be engaged with the chain 32 which wraps approximately one half of the sprocket 20). Thus, as the sprocket 20 rotates, the chain 32 is engaged, alternately, with one sprocket-segment-planet 29 or with the other, with a short transitional overlap during which both sprocket-segment-planets 29 are engaged. In order to make the transition between the sprocket-segment-planets 29 as smooth as possible, it is preferred to make it while a minimum amount of power is transmitted through the chain 32. Since the transition occurs when the sprocket-segment-planets 29 are at their top/bottom position, and since a rider usually pedals lighter when the pedals are at their top/bottom position, arranging the pedals 12 and the sprocket-segment-planets 29 along the same imaginary line will synchronize the two to coincide.

Each of the planets 29, 31 & 31', is engaged with its own respective keyways and the respective spiral-wavy-cam 26 which controls the radial location of the respective planet. Therefore, it is a designer's option to maintain all the planets at equal distances from the axle 13 or to move one opposing pair, planets 29 for example, further away from the axle 13 so that an imaginary ellipse can be drawn through planets 29, 31 & 31'. When such a configuration of planets is orientated relative to the pedals, in accordance with a certain bio-engineering theory, the utilization of the rider's capabilities should be improved. Further, one of the planets 29 can be moved slightly further than the other in order to provide a slightly higher ratio when the rider's stronger foot, usually his right foot, pedals down. The planets 29 will still be maintained in substantially symmetrical positions relative to the axle 13. However, such refinements are probably worthwhile only for people who ride bikes competitively.

A tensioner mechanism 23 takes up chain's slack which occurs when the planets are contracted.

To achieve economical manufacturing and light weight it is preferred to mold the various parts from highly reinforced plastics. For examples the planets can be molded from reinforced nylon and the flanges 21 & 25 from reinforced polyester. Alternatively, die cast aluminum alloy is suitable, especially for manufacturing the flanges, for improved rigidity of the sprocket 20.

OPERATION

The bicycle is ridden and pedaled like a conventional bicycle, with the improvement that lowering the transmission ratio (which is the effective diameter of the sprocket 20 divided by the effective diameter of the rear sprocket 17) is done by back pedaling while energizing the brake 38, thereby slowing the indexing flange 25 relative to the drive flange 21 and causing the intersections of the keyways 24 and the spiral-wavy-cam 26 to radially move towards the axle 13, contracting the planets 29, 31 & 31' and decreasing the effective diameter of the sprocket 20. The one-way-clutch 18 permits back pedaling even when the bicycle is stationary. Shifting to a higher ratio is achieved by braking and slowing the indexing flange 25 relative to the drive flange 21 while pedaling forward, expanding the planets and thereby increasing the effective diameter of the sprocket 20. As the planets are expanded or contracted, the cams 37 are moved from one depression 35 to the next and the length of chain which is trapped between the two sprocket-segment-planets 29 increases or decreases, respectively, by an integral (natural) number of pitches so that the length of the trapped chain remains substantially a integral number of pitches and, therefor, the sprocket-segment-planet 29 remains synchronized with the chain 32 at the point of engagement. When the planets shift over the hills 36, from one depression 35 to the next, the sprocket 20 momentarily goes out of synchronization with the chain 32, but, as soon as the cams 37 are reseated in the depressions 35 the synchronization of the chain 32 with the sprocket-segment-planet 29 is re-established, assuring their proper mesh. If the cams 37 are not properly seated, the chain's load pushes them into the depressions 35. It is easier to shift the sprocket 20, especially to a higher ratio, when the chain's load is minimal, that is when the only tension in the chain 32 is created by the chain tensioner 23. Shifting the transmission to a lower ratio can be done while the bicycle is stationary, since the one-way-clutch 18 allows back pedaling even when the rear wheel 16 is not rotating, and this allows a rider who is stopped while being in a high ratio (in a traffic light, for example) to shift to a lower ratio to ease acceleration. Shifting to a higher ratio takes place while pedaling forward and when only one sprocket-segment-planet 29 is engaged with the chain, since during the transition period when both sprocket-segment-planets 29 are engaged the trapped chain momentarily prevents the planets from expanding.

While the present invention has been illustrated with one specific embodiment, it should be understood that modifications and substitutions can be made without departing from the spirit of the invention or the scope of the claims.

I claim:

1. A variable sprocket comprising in combination:
    an axle,
    a drive flange mounted on said axle,
    an indexing flange rotatably mounted on said axle opposite of said drive flange and having a plurality of spiral-wavy-cams,
    two sprocket-segment-planets and at least two idler-planets connected to said flanges,
    coupling means for transmitting force between said sprocket-segment-planets and said drive flange,
    cam followers attached to said planets for engaging with and following said spiral-wavy-cams,
    said spiral-wavy-cams comprising a series of alternating depressions and hills which move said planets closer and further to and from said axle, respectively, as said planets slide along said spiral-wavy-cams,
    a chain made of links wrapping approximately one half of the periphery of said variable-sprocket,
    said sprocket-segment-planet having means for positively engaging said chain, said means comprising at least one tooth having an incline at a point of contacting said chain, said incline being steep so as to prevent said chain from disengaging from said tooth while said tooth carries chain's load.

2. The subject matter of claim 1, wherein said planets are located, by said cam-followers seated in said depressions, so that when said sprocket-segment-planet engages said chain it takes over the chain's load from the previously engaged sprocket-segment-planet allowing the previously engaged sprocket-segment-planet to become disengaged from said chain.

3. The subject matter of claim 1, wherein the location of said planets when their cam followers are seated in said depressions and when both sprocket-segment-planets are engaged with said chain is such that the length of chain which is trapped between said sprocket-segment-planets is free of tension or slack.

4. The subject matter of claim 1, said planets being sandwiched between said drive-flange and said indexing flange.

5. The subject matter of claim 1, said planet having locking means to prevent it from separating from said spiral-wavy-cam under load.

6. The subject matter of claim 1, said sprocket-segment-planet having locking means to prevent it from separating from said drive flange under load.

* * * * *